US011651264B2

(12) United States Patent
Woerner et al.

(10) Patent No.: US 11,651,264 B2
(45) Date of Patent: May 16, 2023

(54) SYSTEM AND METHOD FOR HANDLING INEQUALITY CONSTRAINTS IN MIXED BINARY OPTIMIZATION ON QUANTUM COMPUTERS

(71) Applicant: International Business Machines Corporation, Armonk, NY (US)

(72) Inventors: Stefan Woerner, Zürich (CH); Daniel Josef Egger, Zürich (CH); Jennifer Ranae Glick, White Plains, NY (US); Takashi Imamichi, Kawasaki (JP); Atsushi Matsuo, Funabashi (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 617 days.

(21) Appl. No.: 16/739,591

(22) Filed: Jan. 10, 2020

(65) Prior Publication Data
US 2021/0216897 A1 Jul. 15, 2021

(51) Int. Cl.
*G06N 10/00* (2022.01)
*G06F 17/18* (2006.01)
*G06F 17/11* (2006.01)

(52) U.S. Cl.
CPC ............. *G06N 10/00* (2019.01); *G06F 17/11* (2013.01); *G06F 17/18* (2013.01)

(58) Field of Classification Search
None
See application file for complete search history.

(56) References Cited

U.S. PATENT DOCUMENTS

| 9,836,432 B2 | 12/2017 | Ronagh |
| 10,223,084 B1 | 3/2019 | Dunn |
| 10,275,422 B2 | 4/2019 | Israel et al. |
| 2014/0187427 A1* | 7/2014 | Macready ................ G06N 5/02 706/46 |
| 2015/0205759 A1* | 7/2015 | Israel ...................... G06F 17/11 703/2 |
| 2020/0226197 A1* | 7/2020 | Woerner ................ G06N 10/00 |

OTHER PUBLICATIONS

Lee Braine, Daniel J. Egger, Jennifer Glick, Stefan Woerner; Quantum Algorithms for Mixed Binary Optimization applied to Transaction Settlement (Year: 2016).*

(Continued)

*Primary Examiner* — Lina M Cordero
(74) *Attorney, Agent, or Firm* — Amin, Turocy & Watson, LLP

(57) ABSTRACT

Systems and methods that address an optimized method to improve systems and methods for handling inequality constraints in mixed binary optimization problems on quantum computers and to solve local optima which significantly improves system performance. Embodiments employ an improved methodology that can optimize parameters, determine an optimal slack variable and optimize variational parameters for fixed slack variables. This procedure allows to move out of local minima, solve an optimization and improve the system performance by providing optimal results. These embodiments also extend to variational hybrid quantum/classical algorithms for gate-based quantum computers.

36 Claims, 9 Drawing Sheets

(56) References Cited

OTHER PUBLICATIONS

Pooya et al., "Solving Constrained Quadratic Binary Problems Via Quantum Adiabatic Evolution," arXiv:1509.05001v2 [math.OC], Feb. 9, 2018, 22 pages.
Glover et al., "A Tutorial on Formulating and Using QUBO Models," arXiv:1811.11538 [cs.DS], Nov. 13, 2018, 53 pages.
Vyskocil et al., "Embedding Equality Constraints of Optimization Problems into a Quantum Annealer," Proceedings of the IEEE International Conference on Rebooting Computing (ICRC 2018), Apr. 17, 2019, 24 pages.

* cited by examiner

SYSTEM AND METHOD FOR HANDLING INEQUALITY CONSTRAINTS IN MIXED BINARY OPTIMIZATION ON QUANTUM COMPUTERS

TECHNICAL FIELD

The subject disclosure relates generally to a system and method that improves optimization methods for handling inequality constraints in mixed binary optimization problems on quantum computers and to solve local optima to facilitate improving system performance.

SUMMARY

The following presents a summary to provide a basic understanding of one or more embodiments of the invention. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that improves optimization methods for handling inequality constraints in mixed binary optimization problems on quantum computers and to solve local optima which significantly improves the system performance.

In accordance with an embodiment, a system, comprises: a memory that stores computer-executable components; a quantum processor, operably coupled to the memory, that executes the computer-executable components stored in the memory, wherein the computer-executable components comprise: an analyzing component that analyzes a classical objective function where inequality constraints are detected along with slack variables; an optimizing component that performs optimization on variational parameters and the analyzed slack variables in a quantum optimization setup; a derivation component that derives a set of slack variables subsequent to optimization, that satisfies an equality constraint; a determination component that determines a bit string to perform with the derived set of slack variables; and a computing component that determines variational parameters for the set of derived slack variables.

In accordance with an embodiment, a computer implemented method, comprises: using a processor to execute computer executable components stored in memory to perform the following acts: analyze a classical objective function where inequality constraints are detected along with slack variables; optimize on variational parameters and the analyzed slack variables to handle inequality constraints; derive the slack variables subsequent to optimization in order to satisfy an equality constraint; determine a corresponding objective value and find a bit string to perform with the derived set of slack variables; and fix the derived slack variables to only optimize over the variational parameters along with any possible continuous variables.

DETAILED DESCRIPTION

Figure 1:
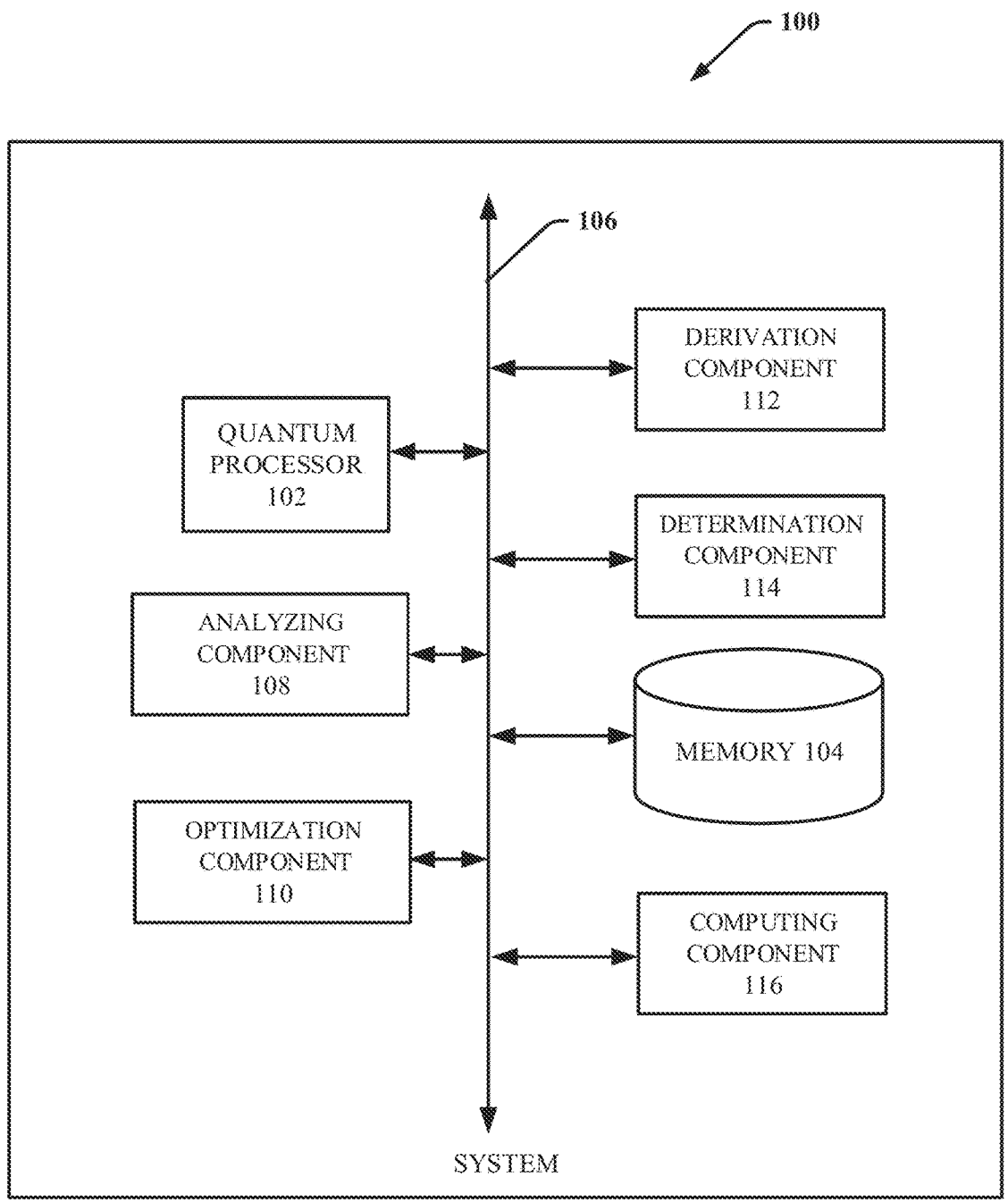
FIG. 1 illustrates a block diagram of an example system implemented that improves optimization methods for handling inequality constraints in mixed binary optimization problems on quantum computers.

The following detailed description is merely illustrative and is not intended to limit embodiments and/or application or uses of embodiments. Furthermore, there is no intention to be bound by any expressed or implied information presented in the preceding Summary section, or in the Detailed Description section. One or more embodiments are now described with reference to the drawings, wherein like reference numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

In today's digital world, the use of modern computers has increased exponentially. Due to the enormous number of advances in micro processing power over the past decade, the number of transistors that can be incorporated into an integrated circuit is doubled. This type of analogy was first spotted by what is referred to as Moore's Law. In this law, the number of transistors in a dense integrated circuit doubles about every two years. The results obtained from this law have transformed technology into a trillion-dollar industry. Through this methodology, powerful chips can be found in everything from home computers to autonomous cars to smart devices. However, due physics limitations of how densely logic gates can be packed on a computer chip, Moore's Law may not be able to go on indefinitely. There are physical limitations to have the ability to continually shrink the size of components on a chip and hence a new computing paradigm is needed to get around this problem. Thus, as an essential primitive, quantum computing is receiving more and more attention today.

Quantum computing is generally the use of quantum-mechanical phenomena to perform computing and information processing functions. Quantum computing can be viewed in contrast to classical computing, which generally operates on binary values with transistors. Classical computers can operate on bit values that are either 0 or 1. Almost any device with two distinct states can serve to represent a classical bit: a switch, a valve, a magnet, a coin. Quantum computers, on the other hand, operate on quantum bits that comprise superpositions of both 0 and 1, can entangle multiple quantum bits, and use interference. Superconducting qubits offer a promising path toward constructing fully-operational quantum computers as it can exhibit quantum-mechanical behavior (allowing to be used for quantum information processing) at a macroscopic level (e.g., allowing to be designed and fabricated by existing integrated circuit technologies). A quantum computer uses a qubit as its essential unit instead of a classical computing bit. The qubit is the quantum-mechanical analogue of the classical bit. Whereas classical bits can take on only one of two basis states (e.g., 0 or 1), qubits can take on superpositions of these basis states (e.g., $\alpha|0\rangle+\beta|1\rangle$, where $\alpha$ and $\beta$ are complex scalars such that $|\alpha|^2+|\beta|^2=1$), allowing a number of qubits to theoretically hold exponentially more information than the same number of classical bits. It's not that the qubit can have an intermediate value, such as 0.63; when the state of the qubit is measured, the result is either 0 or 1. But in the course of a computation a qubit can act as if it were a mixture of states—say, 63 percent 0 and 37 percent 1. Thus, quantum computers (e.g., computers that employ qubits instead of solely classical bits) can, in theory, quickly solve some problems that may be extremely difficult for classical computers.

By processing information using the laws of Quantum mechanics, Quantum computers offer novel ways to perform computation tasks such as molecular calculations, financial risk calculations, optimization and many more. For instance, in an investment universe, there is a large set of assets wherein subsets of these assets need to be identified based on budget constraints such that an optimal process is used to identify viable assets that can be purchased to meet the profit margin. The optimal process is calculated based on methods such as mean-variance which is a process of weighing risk, expressed as variance against expected return. However, when the problem comes down to using Quantum computing or Quantum optimization in the investment universe, a 1-1 mapping is used between a number of assets and the number of qubits required in a Quantum computer. Also, one asset can be represented by more than one qubit. In reality, if the number of assets is 1000 or more and the number of qubits is approximately 50 then this optimization mapping currently may not work to identify an optimum portfolio in the investment universe using the current Quantum computers. Moreover, mixed integer binary optimization is a hard problem in Quantum computers. Mixed integer binary optimization depicts the combination of real-values (can take fractions) and integer values. While it is not believed that quantum computers may solve hard problems, it can offer heuristics to find near optimal solutions. Such heuristics include the Variational Quantum Eigensolver (VQE) algorithm and the Quantum Approximate Optimization Algorithm (QAOA). The Quadratic Unconstrained Binary Optimization (QUBO) model has gained prominence in recent years with the discovery that it unifies a rich variety of combinatorial optimization problems. Today's algorithms for including inequality constraints into Quadratic Unconstrained Binary Optimization (QUBO) problems include non-negative slack variables to translate inequality to equality constraints which can be added as penalty terms to the QUBO objective. The slack variables are then handled in the classical optimizer together with the variational parameters driving the ansatz that handles the binary variables. This approach is very sensitive as it is prone to get trapped in local optima. Thus, these embodiments show how to improve system and method for handling inequality constraints in mixed binary optimization problems on quantum computers such that this new approach can solve these optimization problems effectively and thus improve the system performance.

In these embodiments, a classical objective function in a quantum optimization setup is used to optimize the variables and move out of local minima to improve system performance and obtain optimal results. These embodiments can be used to solve portfolio optimization problems that map to mixed binary optimization problems. Given a classical objective function, the structure of the given setup is exploited such that the parameters such as variational, continuous and slack variables are optimized. An objective function evaluation entails of sampling from a quantum computer a set of binary strings and combining this with the continuous variables to get a distribution of values. The objective value can be taken as an average of the K shots or use other aggregation functions such as CVaR. Then, slack variables are derived to satisfy the equality constraint. Upon derivation, the corresponding objective value is determined to find a bit string to perform with the slack variables. The slack variables are fixed and optimization is computed over the variational parameters along with any other possible continuous variables. This process is repeated based on the number of iterations setup for the problem or until an optimal solution is obtained. Thus, the novelty in these embodiments is a problem-specific strategy to solve hybrid quantum/classical optimization algorithms. To date, these problems are solved by black-box optimization schemes while these embodiments exploit the known structure to improve efficiency and resulting solution quality. More specifically, these embodiments improve efficiency and resulting solution quality by splitting the variables into the slack variables, used to represent constraints, and other variables. This split allows a more efficient alternating update rule where a strategy can be applied that is targeted to the variable-type, helping to step out of local minima of the overall optimization problem.

FIG. 1 illustrates a block diagram of an example system 100 that can access data and process that data using variable computing components depicted in accordance with one or more embodiments described herein. The system 100 can facilitate a process of assessing and identifying a large amount of various forms of data. The system 100 can also generate predictive recommendations to an individual level resulting in a context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

System 100 can optionally include a server device, one or more networks and one or more devices (not shown). The system 100 can also include or otherwise be associated with at least one processor 102 that executes computer executable components stored in memory 104. The system 100 can further include a system bus 106 that can couple various components including, but not limited to, an analyzing component 108 that can analyze a classical objective function where inequality constraints are detected along with slack variables $s_j$; an optimization component 110 that performs optimization on variational parameters $\theta$ and the analyzed slack variables $s_j$ in a quantum optimization setup; a derivation component 112 that derives a set of slack variables subsequent to optimization, that satisfies an equality constraint; a determination component 114 that determines a bit string to perform with the derived set of slack variables; and a computing component 116 that determines variational parameters for the set of derived slack variables.

System 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the systems 100 and/or any other suitable device that can employ information provided by system 100. It is to be appreciated that systems 100, components, models or devices can be equipped with communication components (not shown) that enable communication between the system, components, models, devices, etc. over one or more networks.

The various components of systems 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It may be appreciated that such systems and components can include these components or sub-components specified therein, some of the specified components or sub-components, and/or additional components. Sub-components may also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

The subject computer processing systems, methods apparatuses and/or computer program products can be employed to solve new problems that arise through advancements in technology, computer networks, the Internet and the like.

Figure 2:
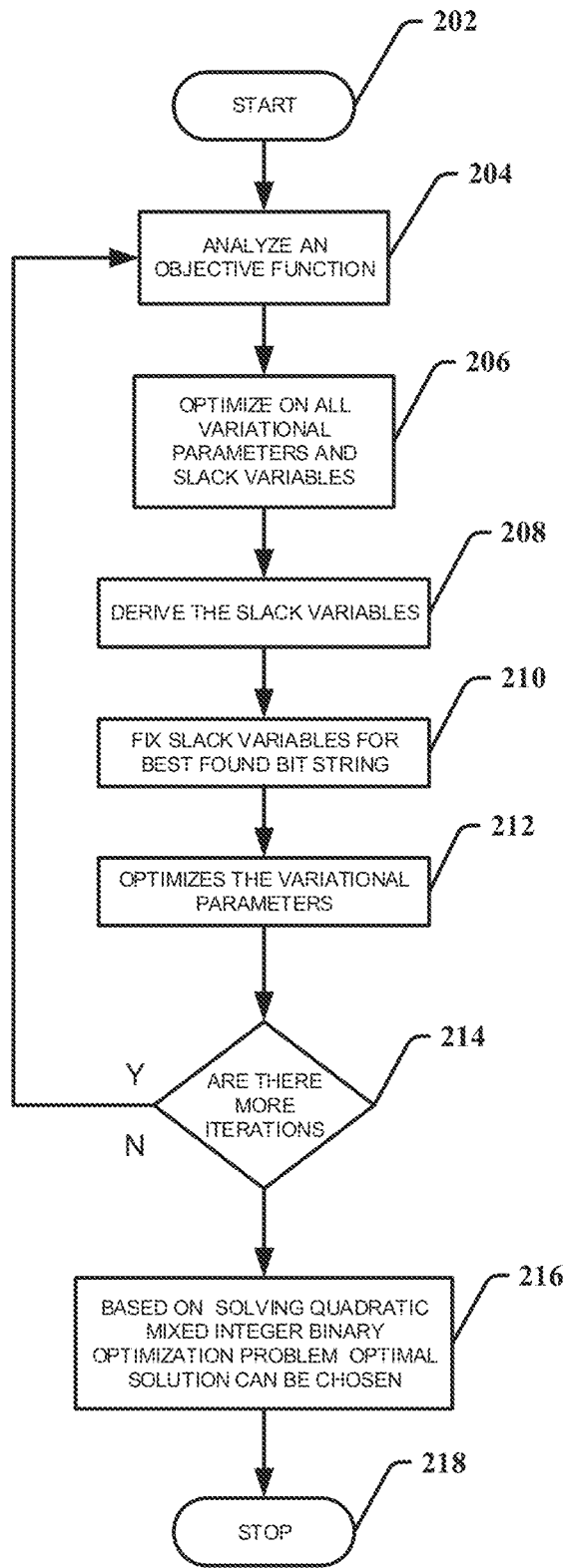
FIG. 2 illustrates an example flowchart of an improved system and method for handling inequality constraints in mixed binary optimization on quantum computers.

FIG. 2 illustrates an example flowchart of an improved system and method for handling inequality constraints in mixed binary optimization problems on quantum computers. In these embodiments, the process starts at 202 by first analyzing an objective function as denoted by block 204. In this function, the inequality constraints are present along with slack variables $s_j$. An optimization is performed on variational parameters θ and slack variables $s_j$ in a Quantum optimization setup as denoted by block 206. While optimizing, a classical optimizer is used to determine solutions for θ and $s_j$ where $s_j \geq 0$. The optimizer uses variational parameters, continuous variables in case of mixed binary optimization and slack variables to handle inequality constraints. This derives the slack variables to satisfy the equality constraint as denoted by block 208. Also, a bit string is determined to perform with the slack variable values as denoted by block 210. Upon determining the values, the variational parameters are optimized for the fixed slack variables as denoted by block 212. If there are more iterations as denoted by block 214, the process repeats from block 204. If there are no more iterations, then based on solving a quadratic mixed integer binary optimization problem, an optimal solution can be chosen as denoted by block 216 and thus completes the process as denoted by block 218. In this way, a problem-specific strategy is used to solve hybrid quantum/classical optimization algorithms. To date, these problems are solved by black-box optimization schemes while these embodiments exploits the known structure to improve efficiency and resulting solution quality. More specifically, these embodiments improve the efficiency by splitting the variables into the slack variables. This split allows a more efficient alternating update rule where a strategy can be applied that is targeted to the variable-type, helping to step out of local minima of the overall optimization problem.

These embodiments mainly focus to solve quadratic mixed integer binary optimization problem. In a general problem setting, consider an optimization problem of a form represented below:

$$\min x^T Q(y)x + c(y)^T x + d(y)$$

$$x \in [0,1]^n$$

$$y \in Y \subset R^m$$

$$\text{subject to: } a(y)_j^T x + b(y)_j \geq 0, j=1 \ldots, J$$

where

Q(y), c(y), d(y) are matrix-, vector-, and scalar-valued functions, y∈Y is 3 continuous variable in a given feasible set, and where we have a set of inequality constraints (equality constraints are skipped here for simplicity but can also be handled)

Q, c, d are matrix, vector and scalar valued function;

$x^T Q x$ is a matrix/vector notation for a quadratic term in multiple variables wherein for a fixed y, this would be in n variables (x is n-dimensional);

$c^T x$ is a linear term;

d is a constant;

c(y) and d(y) are vector and scalar valued functions;

T is used to indicate that the vector x is transposed such that a row vector is used instead of a column vector;

n is a given constant integer, indicating the dimension of x (the number of binary variables);

$a^T_j x + b_j - s_j = 0$ are equality constraints; and $a_j(y)$ and $b_j(y)$ are vector and scalar valued functions.

In these embodiments, the slack variables are listed separately to introduce an efficient way of handling slack variables/inequality constraints. In the equation shown above, x belongs to a set of binary numbers 0 and 1. The problem has a quadratic term $x^T Q(y)x$, a linear term $c(y)^T x$ and a constant d(y). These 3 terms Q, c, and d are built on continuous variable y along with additional inequality constraints of form $a(y)_j^T x + b(y)_j$. To simplify this problem further, the dependencies on y are dropped however, these can be added directly to everything that follows without any restrictions. Also, the inequality constraint is cast to equality constraint by adding non-negative slack variables and this can be represented in a simplified form below:

$$\min x^T Q x + c^T x + d$$

$$x \in [0,1]^n$$

$$s_j \geq 0, j=1 \ldots, J$$

subject to: $a_j^T x + b_j - s_j = 0, j=1 \ldots, J$

By introducing a non-negative slack variable $s_j$, the inequality constraint is transformed into an equality constraint. Slack variables are continuous variables that in this case are greater or equal to 0 and thus Q, c, d, a, and b depend on a continuous variable where $a_j$ and $b_j$ are constants. One manner to solve a quadratic unconstrained binary optimization (QUBO) problem is to employ a quantum computer. QUBO is a pattern matching technique and it is commonly used in machine learning applications. To solve optimization problems on quantum computers, various algorithms such as the VQE or QAOA can be used. The VQE algorithm is a quantum/classical hybrid algorithm that can be used to determine eigenvalues of a large matrix. An eigenvalue is a set of values of a parameter for which a differential equation has a nonzero solution (an eigenfunction) under given conditions. This algorithm has been introduced as a hybrid quantum-classical algorithm for simulating quantum systems. Some examples of quantum simulation using VQE include solving the molecular electronic Schrödinger equation and model systems in condensed matter physics.

Figure 3:
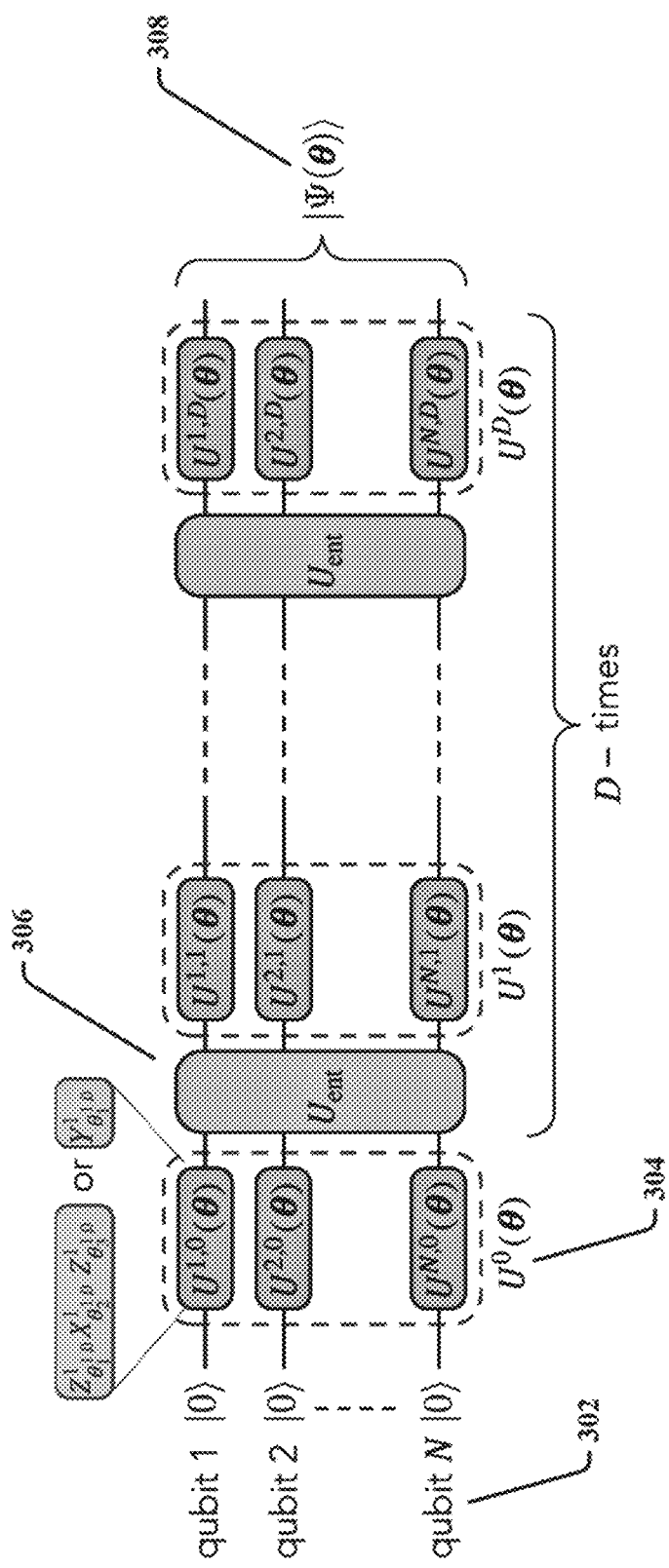
FIG. 3 illustrates an example quantum circuit for a Variational-Quantum Eigensolver (VQE) algorithm.

FIG. 3 illustrates an example quantum circuit for a Variational-Quantum Eigensolver (VQE) algorithm. Preparation of the heuristic trail states comprises two types of quantum gates: single-qubit gate $U(\theta)$ denoted by 304 determined by the rotation angles $\theta$, and an entangling drift operation $U_{ent}$ denoted by 306 acting on pairs of qubits. The blocks in 306 are entangled to different N qubits as denoted by block 302 such that search can reach larger space. This algorithm is repeated D-times and the longer this process runs, the more parameters the system learns to optimize. At the end of the process, the qubits are measured and returns either a 0 or 1. Individual measurement provides a potential answer to the optimization problem. Once this algorithm runs D times with a fixed parameter such as theta in 308, then optimization can be run to obtain an optimal result. Through this technique, the algorithm runs a binary optimization problem into a continuous optimization problem. The QAOA algorithm is another hybrid quantum-classical variational algorithm designed to tackle combinatorial optimization problems. This algorithm depends on a positive integer p and the approximation quality is improved as p is increased. The quantum circuit that implements this algorithm has unitary gates and the depth of the circuit grows linearly with p times the number of constraints. If p is a fixed value, independent of the input size, then the algorithm uses an efficient method called classical preprocessing. If p grows with input size, a different strategy is proposed. These embodiments are not limited to VQE or QAOA algorithms, and any suitable algorithm can be used for quantum optimization depending on a given problem.

Figure 4:
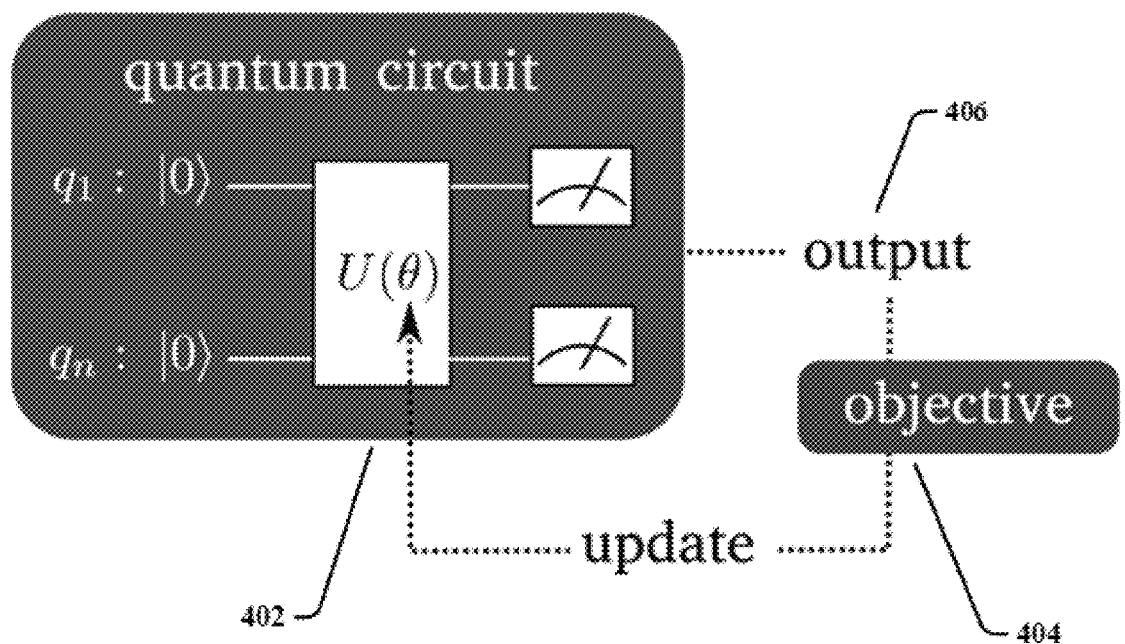
FIG. 4 illustrates an example variational circuit prepared on a quantum computer.

FIG. 4 illustrates an example variational circuit prepared on a quantum computer. In a quantum computer, depending on the state of the function, different candidate solutions may be obtained when a sample is measured from this superposition. In the state-of-the-art for binary optimization (QUBO) problem, to approximate solutions to such a problem on a quantum computer, a variational circuit is used, prepared on a quantum computer, and measured to get possible candidate solutions. A variational circuit is also known as parameterized quantum circuits and is a family of hybrid quantum-classical algorithm. The core of the algorithm is a parameterized quantum circuit which depends on a set of circuit parameters $\theta$ as denoted by block 402. Also, an objective function as denoted by block 404 defines a scalar score for a set of parameters. An output from the quantum circuit as denoted by block 406 generates the results from this variational circuit. The goal is to optimize or train the circuit with respect to the objective. The circuit has a learning algorithm and an objective function with respect to which, the parameterized unitary is trained. Typically, a variational circuit is trained by a classical optimization algorithm that makes queries to the quantum device. The optimization is usually an iterative scheme that obtains better candidates for the parameters $\theta$ in a step, starting with either random or pre-trained initial parameters. In these embodiments, let's denote these samples by:

$$x_k(\theta), k=1, \ldots, K$$

where $\theta$ denotes the parameters of the variational circuit, and K is the number of shots measured at the real hardware for this iteration. A shot is a classification where one example or a small number of examples is given for k class, that is used to prepare a model. These embodiments measure k times and depending on variational parameter $\theta$, different sample solutions are obtained. The variational parameters optimize the parameter $\theta$ using the classical solver to optimize the probability of measuring the candidate solution and thus minimize the objective. To sample these candidate solutions, the measurements can be aggregated by taking an average of the K shots or by using CVaR aggregation function. This helps to define an objective function for a classical optimization over $\theta$ and retain a fraction of the toughest solution. In this way, an optimal sample is used as a solution to the problem. The variational form may depend on the problem itself, which might lead to better convergence properties (e.g., QAOA). Using slack variables allows to take into account mixed binary optimization problems, optimize and solve using VQE and QAOA but in these problems, the integer and continuous variables have many local optima and the optimizer is trapped.

Figure 5:
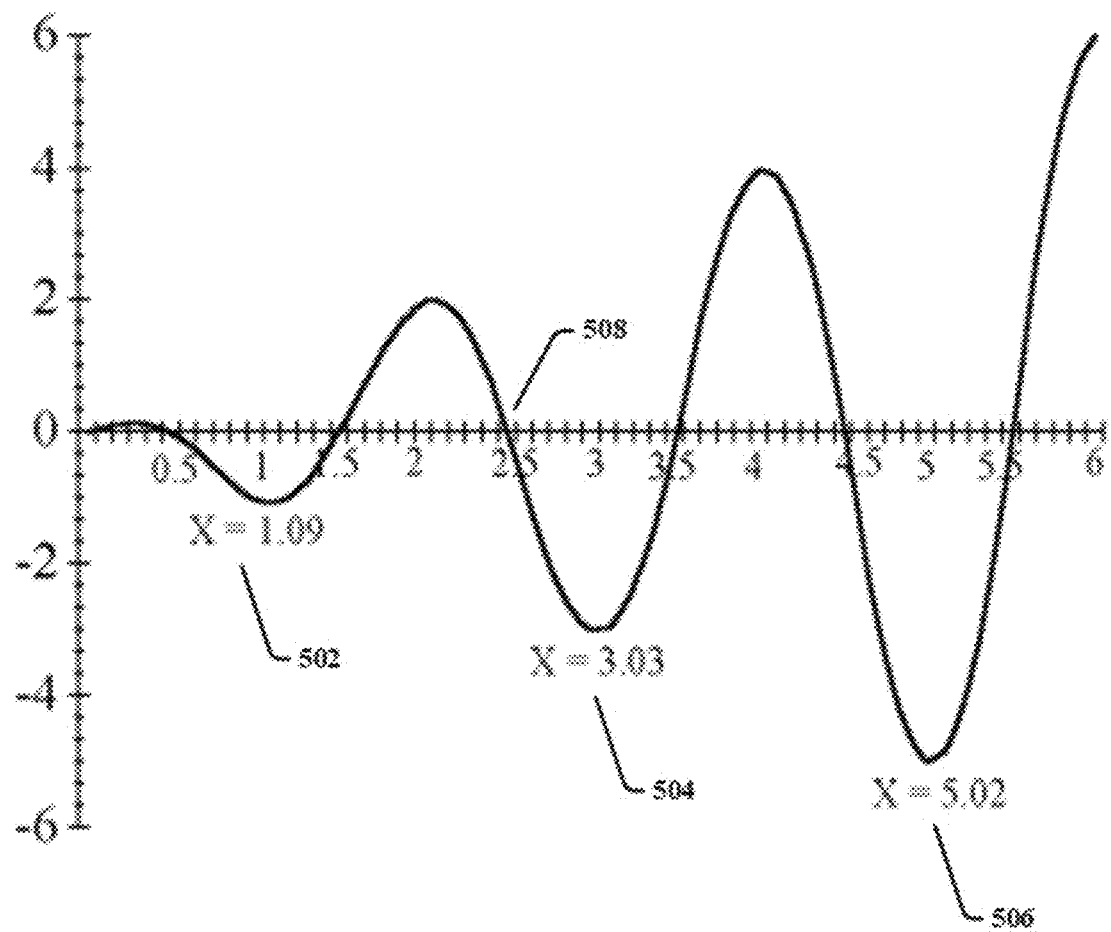
FIG. 5 illustrates an example graph of local optima for a non-linear optimization model.

FIG. 5 illustrates an example graph of local optima for a non-linear optimization model. A local optimum is considered as an optimal solution to a problem within a small neighborhood of possible solutions. A local minimum of a function is a point where the function value is smaller than at nearby points but possibly greater than at a distant point. This is in contrast to the global optimum, which is the optimal solution when a possible solution is considered. A global minimum is a point where the function value is smaller than at other feasible points. Consider a nonlinear model involving the highly nonlinear cosine function min=x*@ cos (3.1416*X) where X<6. The graph shows a plot of the objective function for the values of X between 0 and 6. There are local optimal points at X values as denoted by region 502 when X=1.09. Similarly, at regions 504 and 506 the local optimal points are at X=3.03 and X=5.02. Thus, the global optimum is at X=5.02 as denoted by region 506 as it is the lowest feasible valley. The graph has of a series of hills in which the minimum or lowest elevation is being searched. If the point is at X=2.5 as denoted by region 508, a step towards 2 results with an uphill slope and a step towards 3 results with a downhill slope in search of the lowest point. This may continue to proceed in search of the lowest point. When the search is at point X=3.03 as denoted by region 504, a small flat area is observed where the slope is equal to zero. From this point onwards, the graph begins to lead uphill and as this is in a valley, the lowest point in the immediate neighborhood, this can be considered as a local optimum. However, it is hard to determine if this point is the lowest possible point in the graph. In a state-of-the-art for mixed binary optimization, if the problem contains discrete variable x and continuous variables y, possibly including slack variables $s_j$, the classical optimizer can be used to handle the continuous variables θ replacing the discrete variables together with the continuous variables, e.g., it optimizes over (θ,y). Let's say VQE is optimizing simultaneously over θ and y and may be trapped in a loop. This approach suffers from many local optima and is difficult to apply in practice since the classical optimizer does not find optimal results.

To encode a QUBO problem using a quantum computer, minimizing a certain objective function subject to a constraint is required. Suppose the following problem (or problem of similar form), with slack variables and equality constraints can be represented in the form:

$$\min x^T Q x + c^T x + d$$

$$x \in [0,1]^n$$

$$s_j \geq 0, j=1 \ldots, J$$

subject to: $a_j^T x + b_j - s_j = 0, j=1 \ldots, J$

To represent this in a quantum computer, a constraint is added to the objective function. The equality constraint is added as penalty terms to the objective function and x is replaced by an average (e.g., CVaR) of K shots for a given θ, where λ is large. This can be represented in the form:

$$\min_{\substack{\theta \\ s_j \geq 0, j=1, \ldots, J}} \frac{1}{K} \sum_{k=1}^{K} \left[ x_k(\theta)^T Q x_k(\theta) + c^T x_k(\theta) + d + \lambda \sum_{j=1}^{J} (a_j^T x_k(\theta) + b_j - s_j)^2 \right]$$

The variable λ is introduced throughout the optimization. This variable heavily penalizes any solution that does not satisfy the inequality constraint. If this equality constraint is violated then the terms are chosen to correspond to λ in the optimization problem. If λ is chosen large enough then these solutions can be heavily penalized. The VQE/QAOA algorithm is used to minimize the subjective function and try to average over the candidate solutions that are sampled. Thus, the sum is ranging from k=1 to K.

Figure 6:
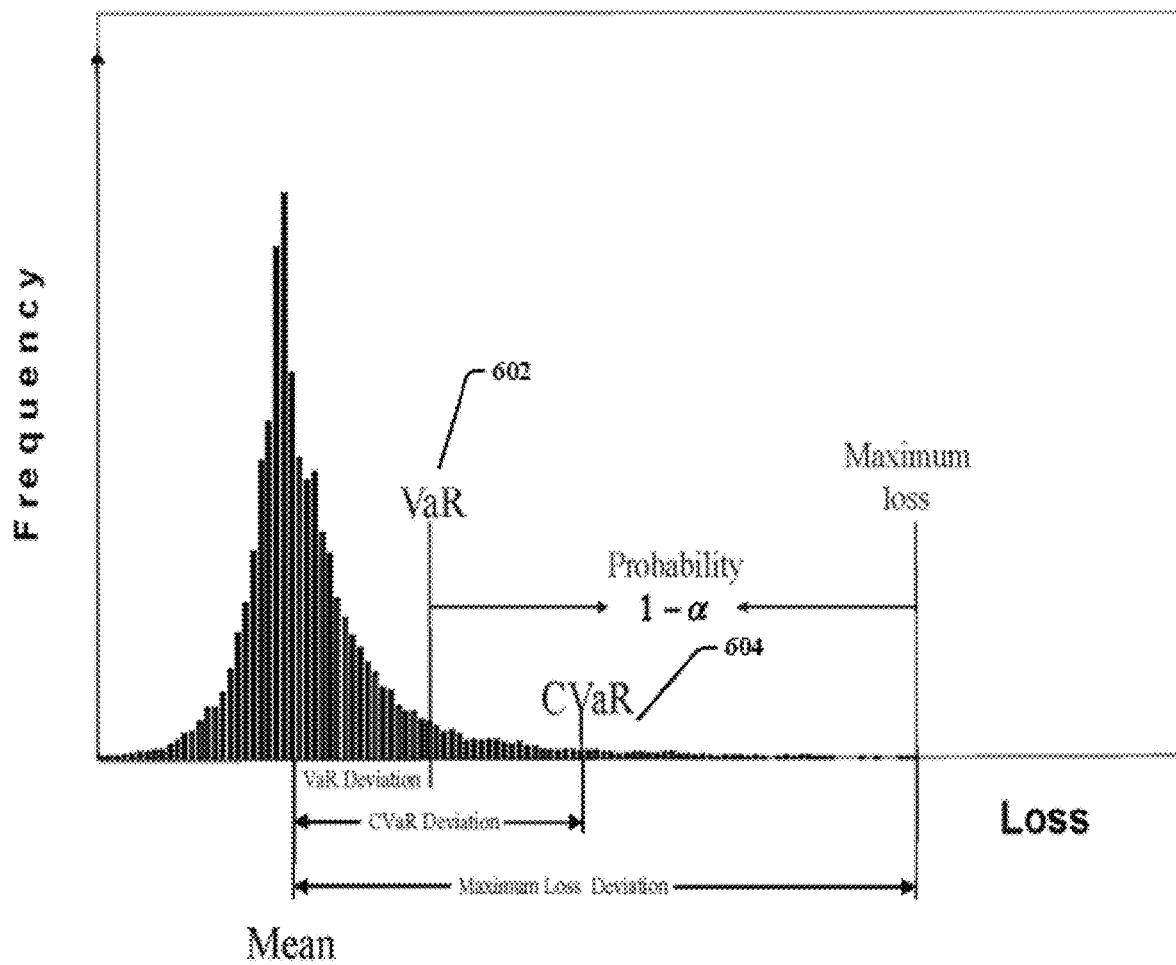
FIG. 6 illustrates an example graph of Value-at-Risk (VaR) and Conditional Value-at-Risk (CVaR) for a distribution scenario.

FIG. 6 illustrates an example graph of VaR and CVaR representation for a distribution scenario. Risk management is a procedure to shape loss distribution and Value-at-Risk (VaR) and Conditional Value-at-Risk (CVaR) are popular functions for measuring risk. The choice between VaR and CVaR is affected by differences in mathematical properties, stability of statistical estimation, simplicity of optimization procedures, and acceptance by regulators. CVaR has superior mathematical properties over VaR. Risk management with CVaR functions can be done efficiently. CVaR accounts for losses exceeding VaR. In a program cost distribution scenario, the cost distribution depicts the worst outcomes with the highest costs. These outcomes are characterized by the VaR as denoted by region 602 and CVaR metrics. Minimizing the CVaR deviation as denoted by region 602 decreases expected value of the cost distribution above VaR. Thus, there are different ways to choose aggregation function by either performing an average as shown in the equation in the section above or by using the CVaR function which aggregates over K shots of optimal candidates. To improve the issue while optimizing where local minima occurs and solver is trapped, these embodiments introduce a set of methods.

Figure 7:
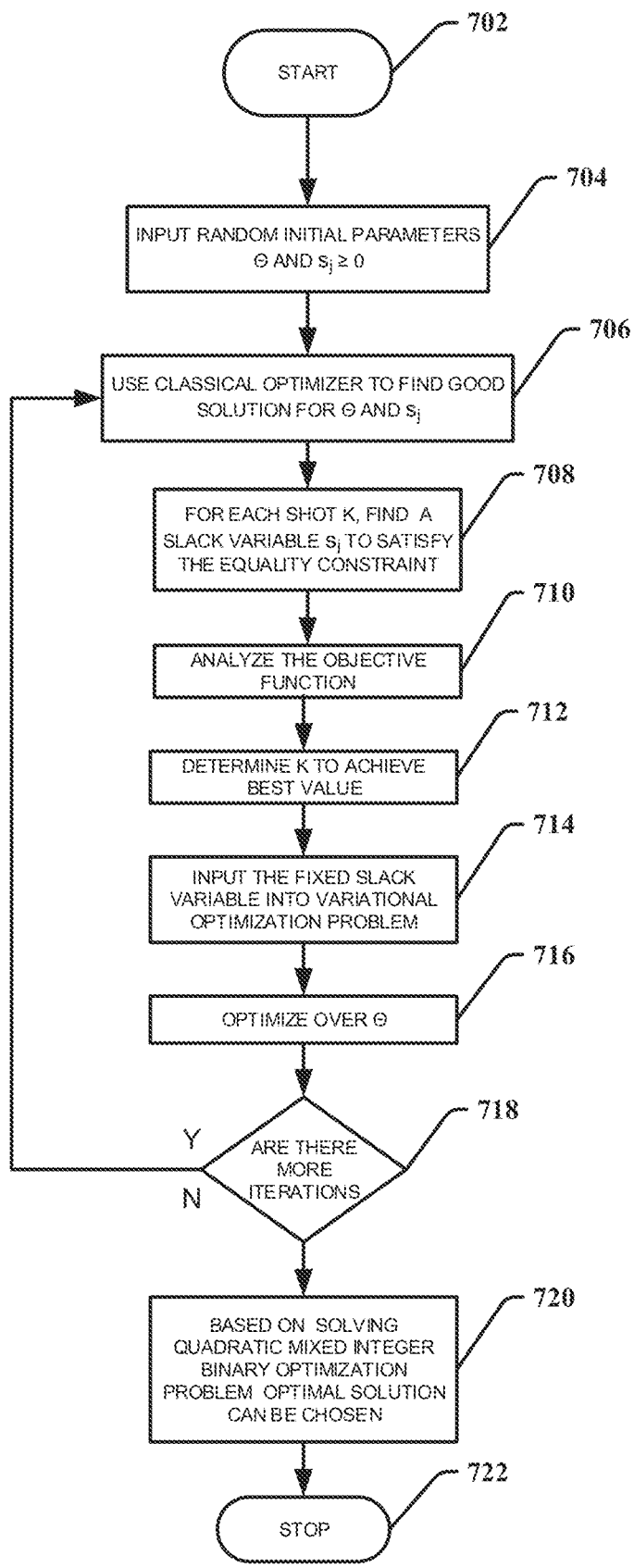
FIG. 7 illustrates an example detailed flowchart of an improved system and method for handling inequality constraints in mixed binary optimization on quantum computers.

FIG. 7 illustrates an example detailed flowchart of an improved system and method for handling inequality constraints in mixed binary optimization on quantum computers. The process starts to solve the quadratic mixed integer binary optimization problem at 702 by first starting with random initial parameters θ and $s_j \geq 0$ as denoted by block 704. The idea is to use a classical optimizer to determine solutions for variational parameter θ in a variational form (VQE/QAOA) and slack variable $s_j$ as denoted by block 706. Then for a shot k=1, . . . , K, fix $x_k(\theta)$ and define for an inequality constraint:

$$a_j^T x_k(\theta) + b_j =: \tilde{s}_{jk}$$

The slack variable $\tilde{s}_{jk}$ satisfies the equality constraint (or 0, if $\tilde{s}_{jk}$ is negative) by finding for a shot k, a slack variable $s_j$ such that the equality constraint is satisfied at 708. Upon determining the slack variable, analyze the objective function for $x_k(\theta)$ and $\tilde{s}_{jk}$ as denoted at 710. Based on the analysis, determine the k that achieves an optimal solution for the problem as at 712. This optimal solution can be denoted as k* which can determine an optimal value of the slack variable to be used in the next run. Input the fixed slack variable $\tilde{s}_{jk^*}$ into the variational optimization problem at 714. Optimize this problem over θ at 716. If there are more iterations at block 718 based on the number of iterations that were predetermined for the problem then the process is repeated from block 706. If there are no more iterations such that the predetermined iterations have been performed and no improvement is noticed in the results then the iteration is terminated. In this way, an optimal solution can be chosen as denoted at 720 and thus completes the process at 722. This method significantly improves the state-of-the-art by explicitly taking into account to solve a classical problem on a quantum computer. These embodiments mainly focus on the single optimal shot and also evaluate many shots on the quantum computer and usually optimize over the average of a subset of samples.

Figure 8:
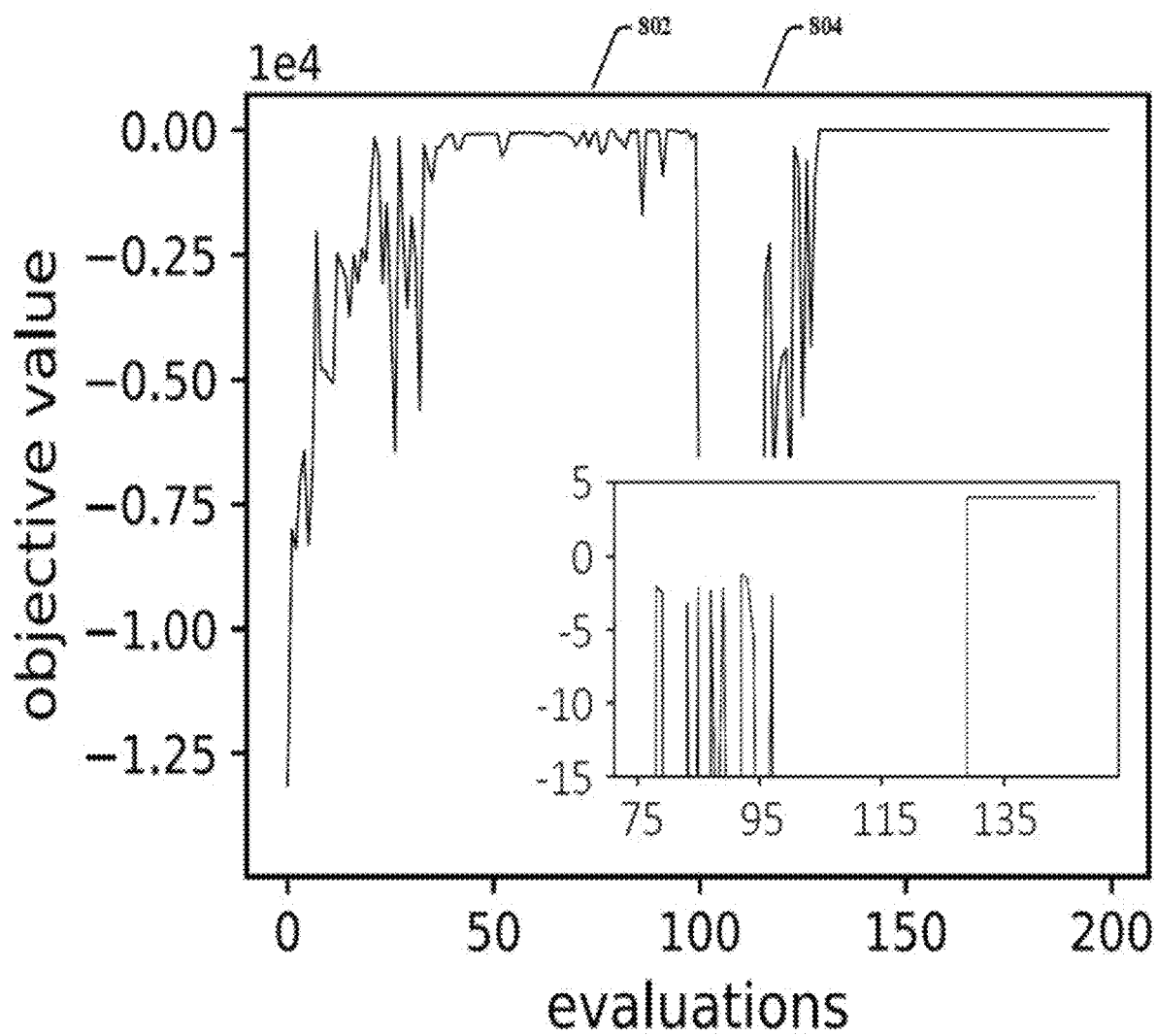
FIG. 8 illustrates an example graph of portfolio optimization for transaction settlement.

FIG. 8 illustrates an example graph of portfolio optimization for transaction settlement. This problem is trying to solve mixed binary portfolio optimization problem to determine an optimal way to settle transaction in a financial context. When the algorithm runs, an improved objective value is obtained as the line increases between 50-95 evaluation points denoted by region 802. After 95 evaluation point, the plot reaches an optimum or a plateau and this can be considered as one of the local minima in which the solver is trapped. Upon, this stage, when the next iteration is executed wherein slack variables are set, optimization is performed. Upon optimization, the objective value is increased from 100-120 evaluation point as denoted by region 804. A new optimum is obtained with an objective value of 4 which is a more effective value than the evaluation at 75-95 point. It can be stated that 4 is the global optimal solution which was found in the 2nd iteration rather than the 1st iteration. Thus, naïve optimization may not provide an optimized result and thus these embodiments solve quadratic mixed integer binary optimization problem in an effective manner to provide optimal results.

Figure 9:
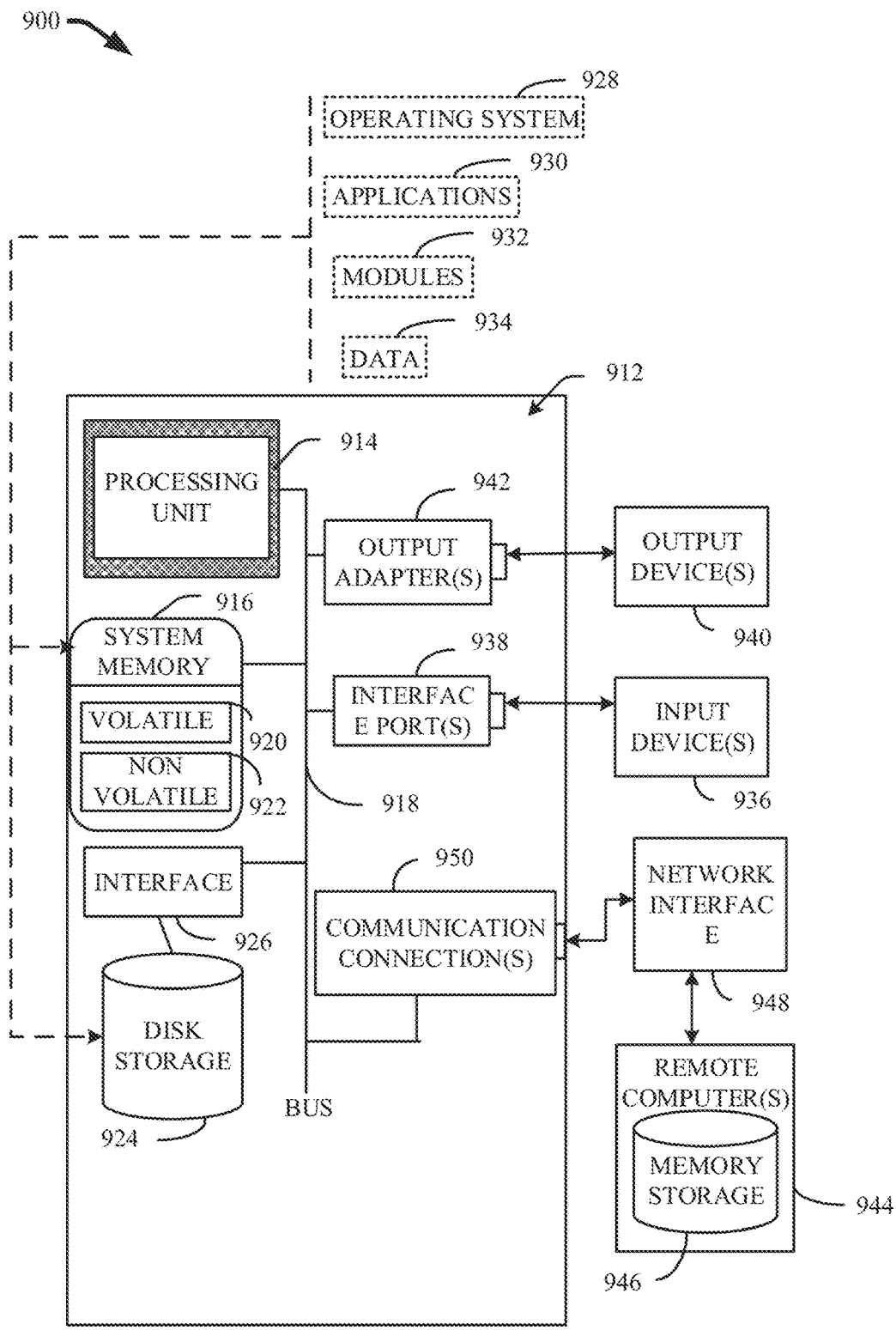
FIG. 9 illustrates a schematic diagram of an example operating environment in accordance with one or more implementations described herein.

FIG. 9 illustrates a suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 916 can also include volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used, such as interface 926. FIG. 9 also depicts software that acts as an intermediary between users and the basic computer resources described in the suitable operating environment 900. Such software can also include, for example, an operating system 928. Operating system 928, which can be stored on disk storage 924, acts to control and allocate resources of the computer 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It can be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor-based appliance, a peer device or other common network node and the like, and typically can also include many or all the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in one or more computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, to perform aspects of the present invention.

Aspects of the present invention are described herein with reference to flowchart illustrations and/or block diagrams of methods, apparatus (systems), and computer program products according to embodiments of the invention. It can be understood that one or more blocks of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, one or more blocks in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It can also be noted that one or more block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art can recognize that this disclosure also can or can be implemented in combination with other program modules. Generally, program modules include routines, programs, components, data structures, etc. that perform particular tasks and/or implement abstract data types. Moreover, those skilled in the art can appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not many aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings may generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe many conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for improving performance of quantum computers handling inequality constraints in mixed binary optimization problems, the system comprising:

a memory that stores computer executable components; and a quantum processor that executes the computer executable components comprising:

an analyzing component that analyzes a classical objective function where the inequality constraints are detected along with slack variables;

an optimizing component that performs optimization on variational parameters and the slack variables in a quantum optimization setup;

a derivation component that derives a set of slack variables, subsequent to the optimization, that satisfies an equality constraint;

a determination component that determines a bit string to perform with the set of slack variables; and a computing component that determines the variational parameters for the set of slack variables and updates a variational circuit of a quantum computer with the variational parameters.

2. The system of claim 1, wherein the optimizing component uses a classical optimizer to determine solutions for the variational parameters $\theta$ and non-negative slack variables $s_j$, where $s_j \geq 0$.

3. The system of claim 2, wherein the optimizing component determines the slack variables and only optimizes over the variational parameters and other continuous variables.

4. The system of claim 3, wherein the computing component further plugs fixed slack variables $\tilde{s}_{jk*}$ into a variational optimization problem and optimizes over $\theta$ only.

5. The system of claim 1, wherein the optimizing component optimizes the variational parameters, continuous variables in case of mixed binary optimization, and the slack variables to handle the inequality constraints.

6. The system of claim 1, wherein an objective function evaluation consists of sampling from the quantum computer a set of binary strings and combining the objective function evaluation with continuous variables to acquire a distribution of values which employs a form:

$$\min x^T Q x + c^T x + d$$

$$x \in [0,1]^n$$

$$s_j \geq 0, j=1 \ldots, J$$

subject to: $a_j^T x + b_j - s_j = 0, j=1 \ldots, J$ wherein Q, c, and d are matrix, vector and scalar valued functions respectively;

$x^T Q x$ is a matrix/vector notation for a quadratic term in multiple variables and x is n-dimensional;

$c^T x$ is a linear term;

d is a constant;

T is used to indicate that vector x is transposed such that a row vector is used instead of a column vector;

n is a given constant integer, indicating a dimension of x (a number of binary variables);

$a_j^T x + b_j - s_j = 0$ are equality constraints where $a_j$ and $b_j$ are constants; and $s_j$ is a non-negative slack variable.

7. The system of claim 6, wherein an average of K shots or an average over a tail of solutions may be chosen as an objective value, wherein K is a number of shots measured.

8. The system of claim 7, wherein the equality constraints are added as penalty terms to the objective value and x is replaced by the average of K shots for a given $\theta$, where $\lambda$ penalizes any solution that does not satisfy an inequality constraint, the equality constraints employing a form:

$$\min_{\theta \atop s_j \geq 0, j=1, \ldots, J} \frac{1}{K} \sum_{k=1}^{K} \left[ x_k(\theta)^T Q x_k(\theta) + c^T x_k(\theta) + d + \lambda \sum_{j=1}^{J} (a_j^T x_k(\theta) + b_j - s_j)^2 \right]$$

wherein $\theta$ denotes parameters of the variational circuit.

9. The system of claim 1, wherein the derivation component derives the set of slack variables for an inequality constraint as well as observed binary strings that satisfy the equality constraint.

10. The system of claim 9, wherein for a shot $k=1, \ldots K$, $X_k(\theta)$ is fixed and the inequality constraint is defined as:

$$a_j^T x_k(\theta) + b_j =: \tilde{s}_{jk}$$

wherein a slack variable $\tilde{s}_{jk}$ satisfies the equality constraint, or the equality constraint is equal to 0, when $\tilde{s}_{jk}$ is negative.

11. The system of claim 1, wherein the determination component analyzes the classical objective function and determines a corresponding objective value to determine the bit string to perform with the set of slack variables.

12. The system of claim 11, wherein the determination component further analyzes the classical objective function for $X_k(\theta)$ and a slack variable $\tilde{s}_{jk}$, and determines a shot k that achieves an optimal value (k*).

13. A computer-implemented method for improving performance of quantum computers handling inequality constraints in mixed binary optimization problems, the computer-implemented method comprising:

using a quantum processor to execute computer executable components stored in memory to perform the following acts:

using the quantum processor to analyze a classical objective function where the inequality constraints are detected along with slack variables;

using the quantum processor to perform optimization on variational parameters and the slack variables in a quantum optimization setup;

using the quantum processor to derive a set of slack variables, subsequent to the optimization, that satisfies an equality constraint;

using the quantum processor to determine a bit string to perform with the set of slack variables;

using the quantum processor to optimize the variational parameters for the set of slack variables; and using the quantum processor to update a variational circuit of a quantum computer with the variational parameters.

14. The method of claim 13, further comprising using a classical optimizer to determine solutions for the variational parameters $\theta$ and non-negative slack variables $s_j$, where $s_j \geq 0$.

15. The method of claim 14, further comprising using the quantum processor to perform an objective function evaluation that consists of sampling from the quantum computer a set of binary strings and combining the objective function evaluation with continuous variables to acquire a distribution of values that employs a form:

$$\min x^T Q x + c^T x + d$$

$$x \in [0,1]^n$$

$$s_j \geq 0, j=1 \ldots, J$$

subject to: $a_j^T x + b_j - s_j = 0, j=1 \ldots, J$ wherein Q, c, and d are matrix, vector and scalar valued functions respectively;

$x^T Q x$ is a matrix/vector notation for a quadratic term in multiple variables and x is n-dimensional;

$c^T x$ is a linear term;

d is a constant;

T is used to indicate that vector x is transposed such that a row vector is used instead of a column vector;

n is a given constant integer, indicating a dimension of x (a number of binary variables);

$a^T_j x + b_j - s_j = 0$ are equality constraints where $a_j$ and $b_j$ are constants; and $s_j$ is a non-negative slack variable.

16. The method of claim 15, further comprising using the quantum processor to choose an average of K shots or an average over a tail of solutions as an objective value, wherein K is a number of shots measured.

17. The method of claim 16, further comprising using the quantum processor to add the equality constraints as penalty terms to the objective value and replace x by the average of K shots for a given θ, where λ penalizes any solution that does not satisfy an inequality constraint, the equality constraints employing a form:

$$\min_{\substack{\theta \\ s_j \geq 0, j=1,\ldots,J}} \frac{1}{K} \sum_{k=1}^{K} \left[ x_k(\theta)^T Q x_k(\theta) + c^T x_k(\theta) + d + \lambda \sum_{j=1}^{J} \left( a_j^T x_k(\theta) + b_j - s_j \right)^2 \right]$$

wherein θ denotes parameters of the variational circuit.

18. The method of claim 13, further comprising using the quantum processor to optimize the variational parameters, continuous variables in case of mixed binary optimization, and the slack variables to handle the inequality constraints.

19. The method of claim 13, further comprising using the quantum processor to derive the slack variables for the inequality constraints as well as observed binary strings that satisfy the equality constraint.

20. The method of claim 19, further comprising using the quantum processor, for a shot k=1, ... K, to fix $X_k(\theta)$, and to define the inequality constraints in a form:

$a_j^T x_k(\theta) + b_j =: \tilde{s}_{jk}$ wherein a slack variable $\tilde{S}_{jk}$ satisfies the equality constraint, or the equality constraint is equal to 0, when $\tilde{s}_{jk}$ is negative.

21. The method of claim 20, further comprising using the quantum processor to analyze the classical objective function for $X_k(\theta)$ and the slack variable $\tilde{s}_{jk}$, and determine the shot k that achieves an optimal value (k*).

22. The method of claim 21, further comprising using the quantum processor to plug fixed slack variables $\tilde{s}_{jk*}$ into a variational optimization problem and optimize over θ only.

23. The method of claim 13, further comprising using the quantum processor to analyze the classical objective function and determine a corresponding objective value to determine the bit string to perform with the set of slack variables.

24. The method of claim 13, further comprising using the quantum processor to fix the slack variables and only optimize over the variational parameters and other continuous variables.

25. A computer program product for improving performance of quantum computers handling inequality constraints in mixed binary optimization problems, the computer program product comprising a non-transitory computer readable storage medium having program instructions embodied therewith, the program instructions executable by a quantum processor to cause the quantum processor to:

analyze, using the quantum processor, a classical objective function where the inequality constraints are detected along with slack variables;

optimize, using the quantum processor, on variational parameters and the slack variables in a quantum optimization setup;

derive, using the quantum processor, a set of slack variables, subsequent to the optimization, that satisfies an equality constraint;

determinate, using the quantum processor, a bit string to perform with the set of slack variables;

compute, using the quantum processor, the variational parameters for the set of slack variables; and update, using the quantum processor, a variational circuit of a quantum computer with the variational parameters.

26. The computer program product of claim 25, wherein the program instructions are further executable by the quantum processor to cause the quantum processor to: determine solutions for the variational parameters θ and non-negative slack variables $s_j$, where $s_j \geq 0$.

27. The computer program product of claim 25, wherein the program instructions are further executable by the quantum processor to cause the quantum processor to: optimize the variational parameters, continuous variables in case of mixed binary optimization, and the slack variables to handle the inequality constraints.

28. The computer program product of claim 25, wherein the program instructions are further executable by the quantum processor to cause the quantum processor to perform an objective function evaluation that consists of sampling from the quantum computer a set of binary strings and combining the objective function evaluation with continuous variables to acquire a distribution of values which employs a form:

min $x^T Q x + c^T x + d$ $x \in [0,1]^n$ $s_j \geq 0, j=1 \ldots, J$ subject to: $a_j^T x + b_j - s_j = 0, j=1 \ldots, J$ wherein Q, c, and d are matrix, vector and scalar valued functions respectively;

$x^T Q x$ is a matrix/vector notation for a quadratic term in multiple variables and x is n-dimensional;

$c^T x$ is a linear term;

d is a constant;

T is used to indicate that vector x is transposed such that a row vector is used instead of a column vector;

n is a given constant integer, indicating a dimension of x (a number of binary variables);

$a^T_j x + b_j - s_j = 0$ are equality constraints where $a_j$ and $b_j$ are constants; and $s_j$ is a non-negative slack variable.

29. The computer program product of claim 28, wherein the program instructions are further executable by the quantum processor to cause the quantum processor to take an average of K shots or an average over a tail of solutions as the objective value, wherein K is a number of shots measured.

30. The computer program product of claim 29, wherein the program instructions are further executable by the quantum processor to cause the quantum processor to add the equality constraints as penalty terms to the classical objective function and replace x by the average of K shots for a given θ, where λ penalizes any solution that does not satisfy an inequality constraint, the equality constraints employing a form:

$$\min_{\substack{\theta \\ s_j \geq 0, j=1,\ldots,J}} \frac{1}{K} \sum_{k=1}^{K} \left[ x_k(\theta)^T Q x_k(\theta) + c^T x_k(\theta) + d + \lambda \sum_{j=1}^{J} (a_j^T x_k(\theta) + b_j - s_j)^2 \right]$$

wherein θ denotes parameters of the variational circuit.

31. The computer program product of claim 25, wherein the program instructions are further executable by the quantum processor to cause the quantum processor to derive the slack variables for an inequality constraint as well as observed binary strings that satisfy the equality constraint.

32. The computer program product of claim 31, wherein the program instructions are further executable by the quantum processor to cause the quantum processor, to fix $X_k(\theta)$ for a shot k=1, ... K, and to define the inequality constraint which employs a form:

$$a_j^T x_k(\theta) + b_j =: \tilde{s}_{jk}$$

wherein a slack variable $\tilde{S}_{jk}$ satisfies the equality constraint or the equality constraint is equal to 0, when $\tilde{s}_{jk}$ is negative.

33. The computer program product of claim 32, wherein the program instructions are further executable by the quantum processor to cause the quantum processor to analyze the classical objective function for $X_k(\theta)$ and the slack variable $\tilde{s}_{jk}$ and determine the shot k that achieves an optimal value (k*).

34. The computer program product of claim 25, wherein the program instructions are further executable by the quantum processor to cause the quantum processor to analyze the classical objective function and determine a corresponding objective value to determine the bit string to perform with the set of slack variables.

35. The computer program product of claim 25, wherein the program instructions are further executable by the quantum processor to cause the quantum processor to fix the slack variables and only optimize over the variational parameters and other continuous variables.

36. The computer program product of claim 35, wherein the program instructions are further executable by the quantum processor to cause the quantum processor to plug fixed slack variables $\tilde{s}_{jk}$ into a variational optimization problem and optimize over θ only.

* * * * *